(No Model.)
W. R. FUNK.
SPIKE.
No. 502,856. Patented Aug. 8, 1893.
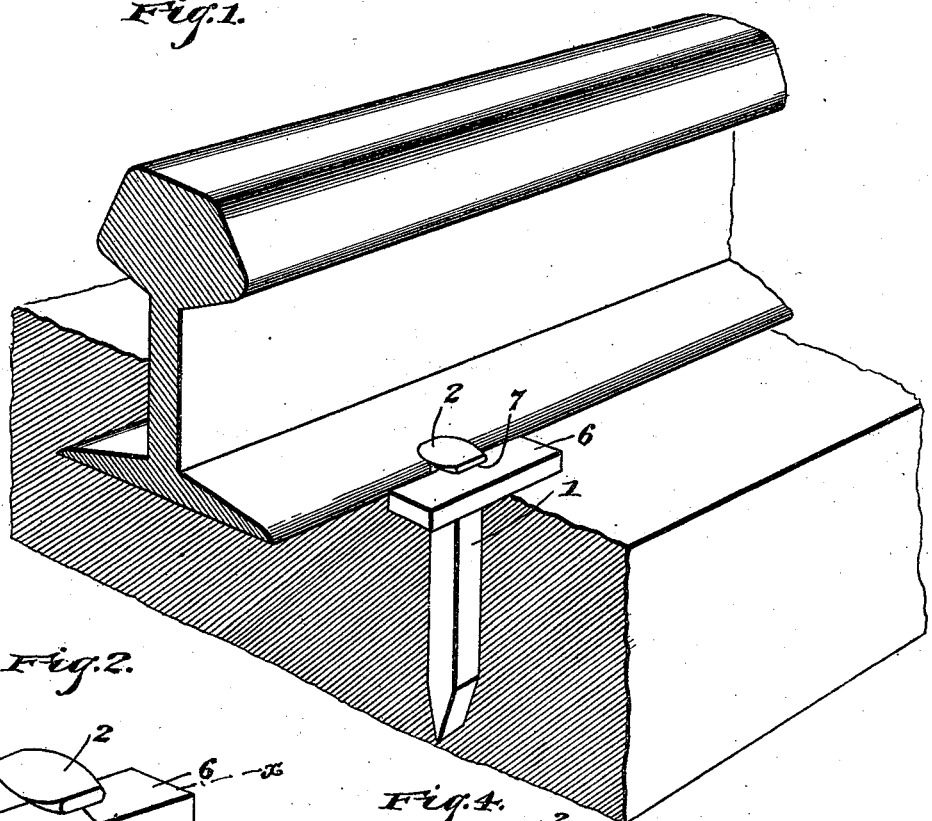
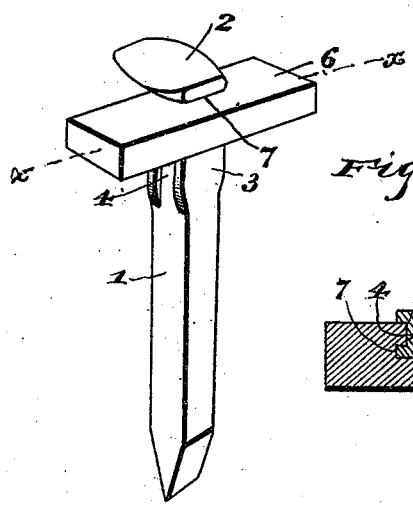
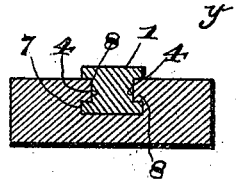
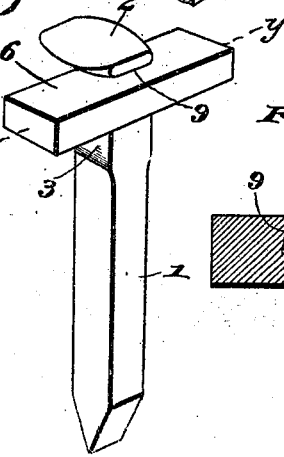
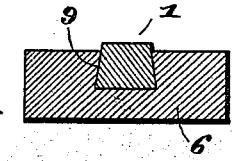
Witnesses
O. S. Ober
Chas. S. Hyer
Inventor
William R. Funk,
By his Attorneys,
C. A. Snow & Co.

UNITED STATES PATENT OFFICE.

WILLIAM R. FUNK, OF LEXINGTON, NEBRASKA, ASSIGNOR OF ONE-FOURTH TO WILLIAM T. DOUGHTY, OF SAME PLACE.

SPIKE.

SPECIFICATION forming part of Letters Patent No. 502,856, dated August 8, 1893.

Application filed March 30, 1893. Serial No. 468,383. (No model.)

*To all whom it may concern:*

Be it known that I, WILLIAM R. FUNK, a citizen of the United States, residing at Lexington, in the county of Dawson and State of Nebraska, have invented a new and useful Spike, of which the following is a specification.

This invention relates to spikes arranged for use with the linear parts, as well as the curves, of railway tracks, and has for its object to render the rails secure and prevent any liability of their spreading.

With this and other ends in view, the invention consists of the construction and arrangement of the parts thereof as will hereinafter be more fully described and claimed.

In the drawings: Figure 1 is a sectional perspective of a part of a tie and a rail thereon, showing the improved spike in position. Fig. 2 is a detail perspective view of the spike and its attachment on an enlarged scale. Fig. 3 is a horizontal section on the line $x$—$x$, Fig. 2. Fig. 4 is a detail perspective view of a spike and its attachment embodying a modification. Fig. 5 is a horizontal section on the line $y$—$y$, Fig. 4.

This invention embodies an improvement on Patent No. 457,267, granted to me August 4, 1891.

Similar numerals of reference indicate corresponding parts in the several figures of the drawings.

Referring to the drawings, the numeral 1 designates a spike with the ordinary flanged head 2, and immediately under said head the shank of the spike is formed with an enlargement 3, which, as shown in Figs. 1, 2, and 3, is rectangular in cross-section and has the opposite edges thereof formed with grooves 4. The enlargement 3 in each of the forms shown depends a short distance downwardly over the length of the shank and merges into the main body of the shank gradually, the said main body of the shank being of the same dimension as the ordinary railroad spike.

The spike as formed in the present instance is arranged to receive a retaining brace 6, that is so formed as to be readily slipped on the spike and, as illustrated in Figs. 1, 2, and 3, one edge of the said brace is formed with a recess 7, having inwardly-projecting tongues at the open side of the same that extend inwardly and contract the mouth or edges to the said recess. The distance between the inner terminations of the tongues 8 is such as to permit the insertion of the shank of the spike below the enlargement 3 into the recess 7, but when the brace is moved upwardly over the enlargement the said tongues engage the grooves 4, and thereby the brace is held in connection with the upper part of the spike.

As shown in Figs. 4 and 5, the enlargement 3 is formed with beveled sides to contract the same, and I construct the shank at that part, which is located adjacent to the flange of the rail, of approximately the same width as the lower part of said shank and extend the outer part of the enlargement laterally, and in this instance the brace 6 is formed with a dovetailed recess 9, that is held inseparably in connection with the enlargement when moved upwardly over the latter, it being understood that the mouth or entrance to said recess 9 is sufficiently large to permit the spike shank below the said enlargement to freely pass thereinto.

In applying the spike and its attachment, the said spike is driven some distance into the tie and the brace is then fitted to the spike and moved upwardly on the enlargement, and in view of the forms of construction of said enlargement, the said brace is held firmly in position, and the spike is then fully driven home until the flanged head thereof properly bears upon the flange of the rail, and at the same time the brace will be seated at the opposite side against the tie and resist any tendency or liability to spreading of the rail because an extended bearing surface on the outer side of the spike is thereby formed.

The device as a whole is applicable either to linear or curved arrangement of the rail, and will be equally efficient in each instance, and if desired the breadth of the brace may be varied or the thickness thereof may be modified.

The employment of the device set forth obviates the use of a plurality of spikes in a single tie and at a point where the track is liable to spread, as in such places a single spike is insufficient to hold the track against movement. This saves the life of the tie, because where a number of spikes are used the fiber of the tie is disintegrated and a number of openings are formed to admit moisture and cause the tie to rot. By the device herein set forth, this disadvantage is overcome, by reason of the fact that one spike, with the brace attached, will do the same work as a number of spikes, as will be understood.

The herein described spike points two-thirds from the front and one-third on the back, and the advantage of this is to crowd the head of the spike to the rail and point out when driven down.

Changes in the form, proportion, and the minor details of construction may be resorted to without departing from the principles or sacrificing any of the advantages of this invention.

Having described the invention, what is claimed as new is—

1. In combination with a spike having an enlargement formed under the head thereof, a transverse brace provided with a side recess that is fitted over said enlargement on the outer side of the spike below the head and transversely inseparable therefrom and extending the bearing surface of the same, substantially as described.

2. In combination with a spike having an enlargement under the head thereof with grooves in opposite edges of the same, a brace having a recess therein with inwardly-projecting tongues at the mouth or entrance of said recess arranged to movably fit the said grooves in the enlargement, substantially as described.

In testimony that I claim the foregoing as my own I have hereto affixed my signature in the presence of two witnesses.

WILLIAM R. FUNK.

Witnesses:
W. A. HAMMOND,
WM. T. DOUGHTY.